United States Patent
Ueda

[19]

[11] Patent Number: 6,079,218
[45] Date of Patent: *Jun. 27, 2000

[54] AIR CONDITIONER FOR VEHICLES

[75] Inventor: Katsumi Ueda, Nitta-gun, Japan

[73] Assignee: Sanden Corporation, Gunma, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/933,737

[22] Filed: Sep. 23, 1997

Related U.S. Application Data

[62] Division of application No. 08/626,378, Apr. 2, 1996, Pat. No. 5,749,235.

[30] Foreign Application Priority Data

Apr. 6, 1995 [JP] Japan .................................. P7-081360

[51] Int. Cl.[7] .................. B60H 1/22; F25B 5/02; F25B 27/02; F25B 13/00
[52] U.S. Cl. .................. 62/160; 62/238.7; 62/244; 62/324.6; 62/199; 237/2 B
[58] Field of Search .................. 62/244, 160, 238.6, 62/238.7, 199, 324.6, 117; 165/42, 43; 454/156, 159; 237/2 B

[56] References Cited

U.S. PATENT DOCUMENTS

| | | |
|---|---|---|
| 2,479,170 | 8/1949 | Kuempel . |
| 2,575,325 | 11/1951 | Ambrose et al. ...................... 62/238.6 |
| 2,922,290 | 1/1960 | Carraway . |
| 3,817,054 | 6/1974 | Adams . |
| 4,051,692 | 10/1977 | Ku et al. . |
| 4,065,938 | 1/1978 | Jonsson .................................. 237/2 B |
| 4,091,636 | 5/1978 | Margen .................................. 62/238.6 |
| 4,100,763 | 7/1978 | Brody .................................... 62/238.6 |
| 4,163,369 | 8/1979 | Owen ..................................... 237/2 B |
| 4,248,292 | 2/1981 | Beacham ................................. 62/325 |
| 4,316,363 | 2/1982 | McKirdy ................................. 62/412 |
| 4,473,109 | 9/1984 | Kojima et al. . |
| 4,493,193 | 1/1985 | Fisher ..................................... 62/160 |
| 4,494,597 | 1/1985 | Fukami et al. . |
| 4,566,531 | 1/1986 | Stolz ........................................ 62/325 |
| 4,593,609 | 6/1986 | Nagatomo et al. . |
| 4,633,675 | 1/1987 | Sato . |
| 4,718,244 | 1/1988 | Kobayashi . |
| 4,753,083 | 6/1988 | Sato . |
| 4,763,564 | 8/1988 | Czarnecki et al. . |
| 4,779,425 | 10/1988 | Yoshihisa et al. . |
| 4,815,658 | 3/1989 | Hidemitsu et al. . |
| 4,840,039 | 6/1989 | Kazuhiko . |
| 4,991,405 | 2/1991 | Sakamo .................................... 62/244 |
| 5,284,025 | 2/1994 | Kajitani et al. ......................... 62/244 |
| 5,330,385 | 7/1994 | Hotta et al. . |
| 5,692,390 | 12/1997 | Karl et al. .............................. 237/2 B |

FOREIGN PATENT DOCUMENTS

| | | |
|---|---|---|
| 0257017 | 2/1988 | European Pat. Off. . |
| 0356716 | 3/1990 | European Pat. Off. . |
| 0566475 | 10/1993 | European Pat. Off. . |
| 2601127 | 7/1977 | Germany ............................. 62/238.6 |
| 0205507 | 12/1983 | Germany ............................. 62/238.6 |
| 3237275 | 4/1984 | Germany ............................. 454/156 |
| 4209188 | 9/1993 | Germany ................................ 165/41 |
| 0011108 | 1/1982 | Japan .................................... 454/156 |
| 57-178913 | 4/1982 | Japan . |
| 57-126709 | 8/1982 | Japan .................................... 454/159 |

(List continued on next page.)

*Primary Examiner*—John K. Ford
*Attorney, Agent, or Firm*—Baker Botts L.L.P.

[57] ABSTRACT

An air conditioner for a vehicle includes a heat pump system for heating and cooling. The air conditioner includes a ventilation passage for ventilating air from a passenger compartment of the vehicle outside of the vehicle. An accelerating system is provided with the heat pump system for accelerating the evaporation of a refrigerant during air cooling or the condensation of a refrigerant during air heating by using involved energy recovered from air exhausted outside of said vehicle through the ventilation passage. Thereby, the air conditioner increases the heating and cooling ability and reduces the energy necessary for maintaining a constant temperature in the passenger compartment.

4 Claims, 5 Drawing Sheets

FOREIGN PATENT DOCUMENTS

| | | | |
|---|---|---|---|
| 7-182515 | 11/1982 | Japan | 165/43 |
| 59-229118 | 12/1984 | Japan | 237/2 B |
| 61-46719 | 3/1986 | Japan . | |
| 62-181909 | 8/1987 | Japan . | |
| 6-135221 | 5/1994 | Japan | 237/2 B |
| 6-206439 | 7/1994 | Japan | 62/244 |
| 6-206440 | 7/1994 | Japan | 237/2 B |
| 1314341 | 4/1973 | United Kingdom . | |

AIR CONDITIONER FOR VEHICLES

This application is a division of application Ser. No. 08/626,378, filed Apr. 2, 1996, entitled AIR CONDITIONER FOR VEHICLES, now U.S. Pat. No. 5,749,235 filed on May 12, 1998.

BACKGROUND OF THE INVENTION

1. Field of the Invention

The present invention generally relates to an air conditioning system, such as for use in cooling and heating passenger compartments in automotive vehicles, and more particularly, to an air conditioning system having a heat exchanger accelerating system for more efficiently cooling and heating automobile passenger compartment.

2. Description of the Related Art

A heat pump circuit may be used in an automobile air conditioning system to improve the cooling and heating efficiency of the system in the outside air inlet mode of operation. For example, Japanese Patent Application No. 62-181909 describes an automobile air conditioning system that includes a heat pump circuit. When the heat pump circuit is used for heating, a first heat exchanger is disposed in the passenger compartment and is used as a condenser. A second heat exchanger is disposed in the engine compartment and is used as an evaporator.

FIG. 1 illustrates a heat pump-type automotive air conditioning system. Air conditioner 100 includes a variable displacement motor compressor 1, an external heat exchanger 3, and an internal heat exchanger 4. Air for air conditioning is conducted into the interior of the vehicle through a duct 10. External heat exchanger 3 is positioned outside of duct 10, and internal heat exchanger 4 is positioned inside of duct 10.

First, second, third, and fourth openings of four-way valve 2 are connected to the discharge port of compressor 1, a first port of internal heat exchanger 4, the suction port of compressor 1, and a first port of external heat exchanger 3, respectively. A second port of external heat exchanger 3 is connected to the inlet of a receiver 9 via a first check valve 7. The outlet of receiver 9 is connected to internal heat exchanger 4 via a first expansion valve 5. A second expansion valve 6 is provided between the outlet of receiver 9 and the second port of external heat exchanger 3. Further, the second port of internal heat exchanger 4 is connected to the inlet port of receiver 9 via a second check valve 8.

Duct 10 has an outside air inlet port and an inside air inlet port. The balance between outside air and inside air to be drawn into duct 10 is adjusted by a switching damper 12. A motor fan 11 is positioned in duct 10 as a means for drawing outside air into the interior of the vehicle.

In FIG. 1, the solid arrows indicate the direction of refrigerant flow when the heat pump circuit is used for cooling air, and the dashed arrows indicate the direction of refrigerant flow when the heat pump circuit is used for heating. In operation, in response to a demand to cool passenger compartment, four-way valve 2 is switched (solid lines in valve 2) to configure the heat pump circuit as an air cooling system.

When air cooling is performed, the refrigerant is circulated from compressor 1 via four-way valve 2 to the first port of external heat exchanger 3, from the second port of external heat exchanger 3 to the inlet of receiver 9 via check-valve 7, from the outlet of receiver 9 via expansion valve 5 to the second port of internal exchanger 4, and from the first port of internal heat exchanger 4 via four-way valve 2 to compressor 1, as shown by the solid line arrows in FIG. 1. The inside, e.g., recycled, or outside, e.g., fresh, air is introduced into duct 10 through damper 12 and passes through internal heat exchanger 4 due to the operation of motor fan 11. In this configuration, internal heat exchanger 4 is utilized as an evaporator. Consequently, the inside or outside air exchanges heat with the refrigerant in internal heat exchanger 4, and the refrigerant vaporizes due to its absorption of heat from the inside or outside air. As a result, the inside or outside air, which is thus cooled, is blown into passenger compartment 13, whereby passenger compartment 13 is cooled. Subsequently, the air in passenger compartment 13 is vented to the outside of the automobile through ventilation duct 14.

Alternatively, when air heating is performed, the refrigerant is circulated from compressor 1 via four-way valve 2 to the first port of internal heat exchanger 4, from the second port of internal heat exchanger 4 via check valve 8 to the inlet of receiver 9, from the outlet of receiver 9 via expansion valve 6 to the second port of external heat exchanger 3, and from the first port of external heat exchanger 3 via four-way valve 2 to compressor 1, as shown by the dashed line arrows in FIG. 1. The inside or outside air again is introduced into duct 10 through damper 12 and passes through internal heat exchanger 4 due to the operation of motor fan 11. In this configuration, internal heat exchanger 4 is utilized as a condenser. Consequently, the inside or outside air exchanges heat with the refrigerant in internal heat exchanger 4, and the refrigerant is condensed due to its loss of heat to the inside or outside air in duct 10. As a result, the inside or outside air, which is thus heated, is then blown into passenger compartment 13, whereby passenger compartment 13 is heated. Subsequently, the air in passenger compartment 13 is vented to the outside of the vehicle through ventilation duct 14.

Thus, such air conditioning system results in the loss of energy, represented by the calories expended in heating or cooling air blown into the passenger compartment, which the air that is vented outside of the vehicle includes implicitly. The air conditioning system loses this energy outside of the vehicle when the system exhausts unpleasant, e.g., too hot or too cold, and stale air to the outside of the vehicle. Therefore, such heat pump systems consume additional energy to compensate for this vented air.

SUMMARY OF THE INVENTION

Accordingly, it is an object of the present invention to provide a heat pump refrigeration system for motor vehicle which has improved efficiency and superior heating and cooling abilities.

In one embodiment, the present invention discloses an air conditioner for a vehicle including a heat pump system capable of heating or cooling a vehicle compartment. The air conditioner includes a ventilation passage for conducting air in a vehicle compartment outside of the vehicle. The heat pump system includes an external heat exchanger mounted outside the compartment; an internal heat exchanger mounted inside the compartment, which is coupled to the external heat exchanger; a compressor disposed in a refrigerant conduit, wherein the refrigerant conduit places the internal and external heat exchangers in communication to transport refrigerant; and a valve mechanism positioned between the compressor and the internal and external heat exchangers and having at least two positions, a first position, which enables refrigerant to flow between the internal and external heat exchangers in a first direction, and a second position, which enables refrigerant to flow in a second direction opposite to the first direction. An accelerating system is provided within the heat pump system for accelerating the condensation or the evaporation a refrigerant during air heating or air cooling, respectively, by using energy recovered from air being exhausted outside of the vehicle through the ventilation passage. The accelerating system may include a first heat exchanger, which is positioned in parallel to the external heat exchanger and connected to a second heat exchanger, which is disposed in the ventilation passage for exchanging heat between a working fluid with air, which then is exhausted outside of the vehicle through the ventilation passage, and a pump disposed between the first and second heat exchangers for circulating the working fluid.

Other objects, features, and advantages will be apparent to persons of ordinary skill in the art in view of the following detailed description of the invention and the accompanying drawings.

DESCRIPTION OF THE DRAWINGS

Preferred embodiments of the invention are described with reference to the appropriate figures, which are provided by way of example only, and are not intended to limit the scope of the present invention.

DETAILED DESCRIPTION OF THE PREFERRED EMBODIMENTS

Figure 1:
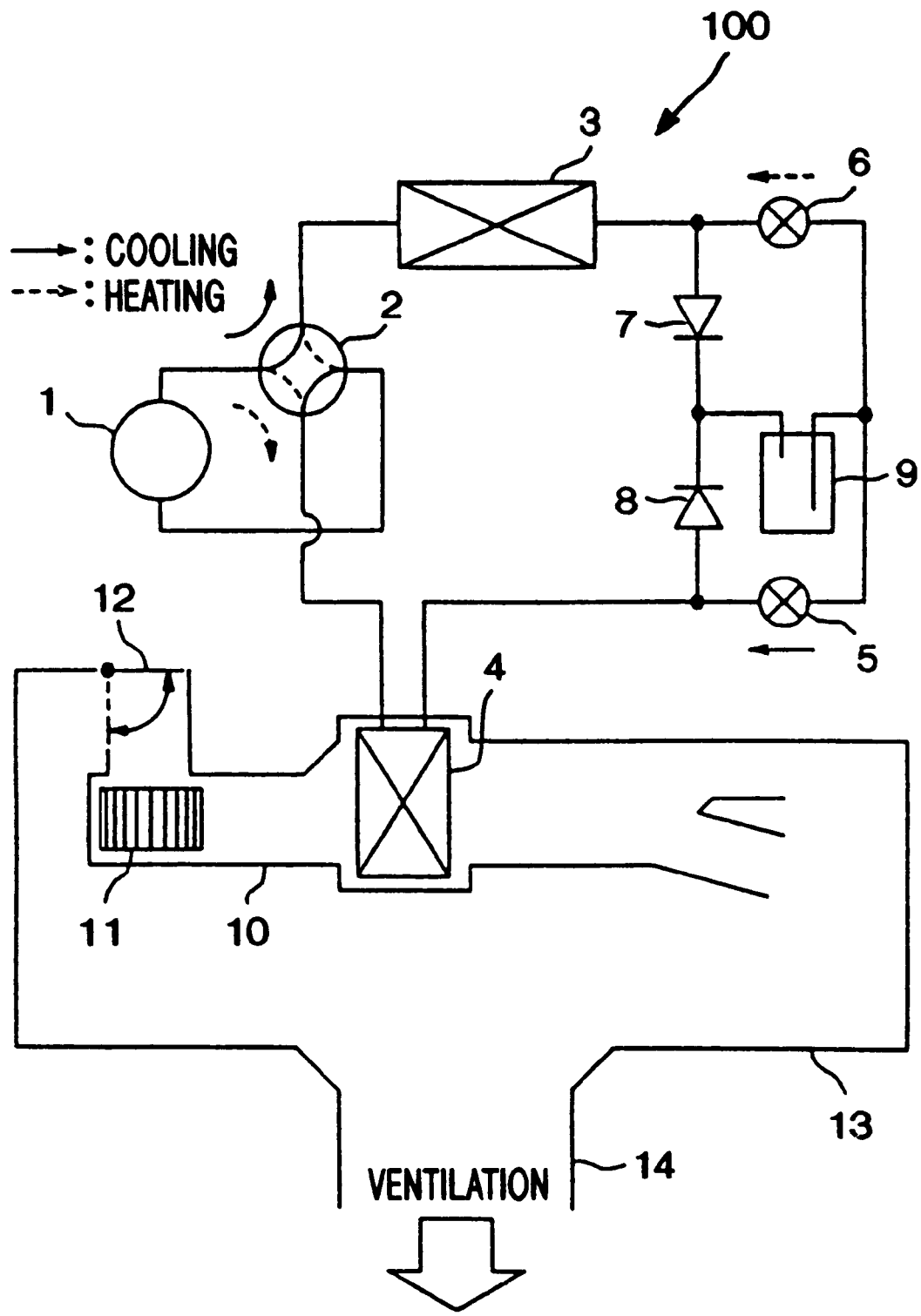
FIG. 1 is a schematic view of an air conditioner for vehicles including a refrigerant circuit diagram according to an embodiment of the prior art.
Figure 2:
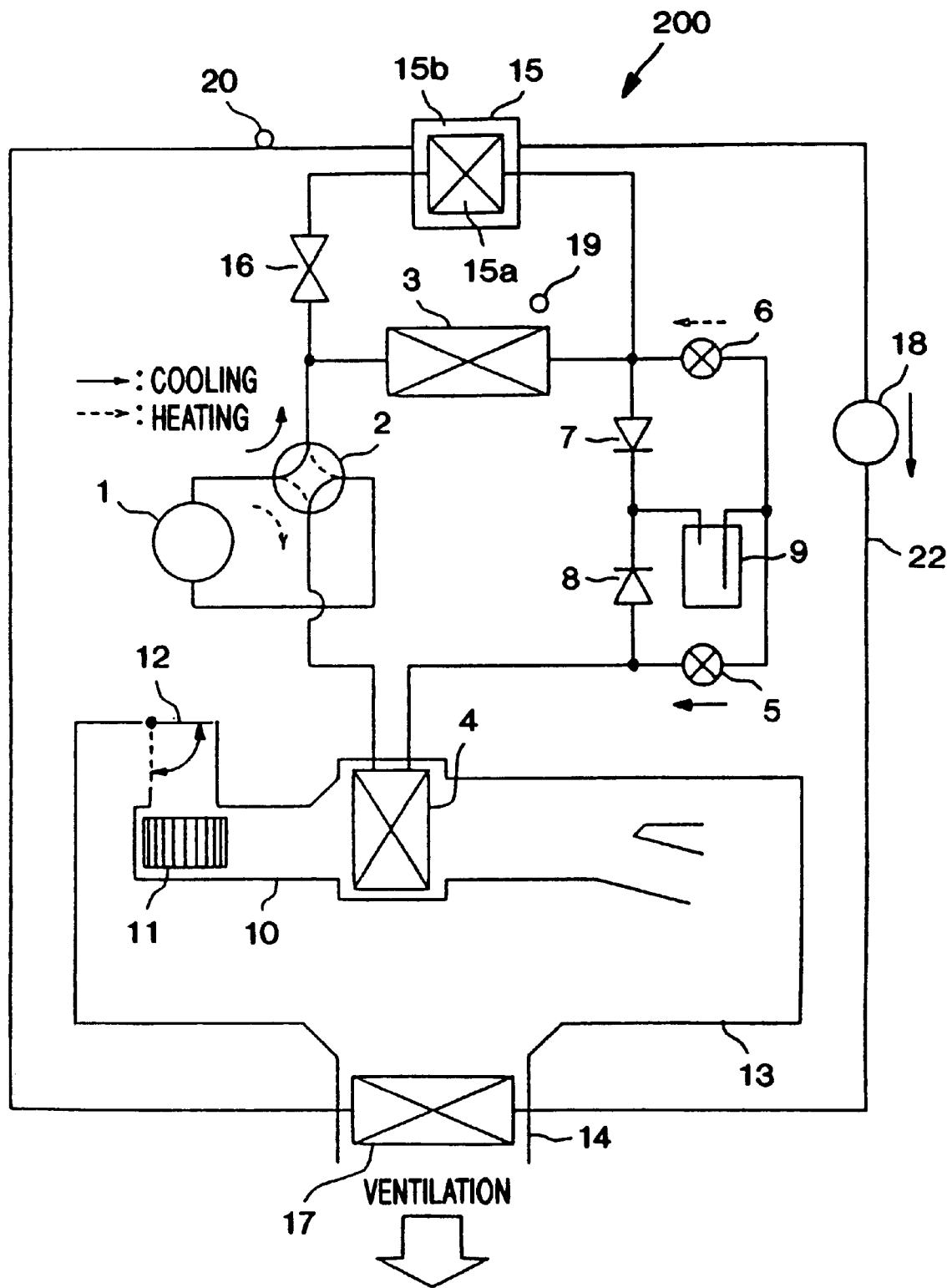
FIG. 2 is a schematic view of an air conditioner for vehicles including a refrigerant circuit diagram according to a first embodiment of the present invention.

With respect to FIG. 2, an air conditioner for a heat pump-type refrigerant circuit is depicted in accordance with a first embodiment. The same numerals are used in FIG. 2 to denote corresponding elements depicted in FIG. 1. Thus, a further detailed explanation of those elements is here omitted.

In the embodiment of FIG. 2, air conditioner 200 includes a first heat exchanger 15 positioned in parallel to external heat exchanger 3 in a refrigerant circuit. First heat exchanger 15 includes refrigerant passageway 15a exchanging heat with the refrigerant and heat medium passageway 15b for exchanging heat with the working fluid. Solenoid valve 16 may be provided in the refrigerant circuit for closing and opening the path of the refrigerant into refrigerant passageway 15a of first heat exchanger 17 which is disposed in ventilation duct 14 for recovering the energy, e.g., the calories expended to heat or cool the vented air, which air is exhausted to the outside of the vehicle through ventilation duct 14. Second heat exchanger 17 is provided in working fluid circuit 22 which connects first heat exchanger 15 with second heat exchanger 17. Circulating pump 18 is provided in working fluid passageway 22 to circulate a cooling/heating medium, such as water or brine, between second heat exchanger 17 and first heat exchanger 15.

Further, air conditioner 200 may include a first temperature sensor 19, such as a thermal switch or a thermistor, which is provided outside of the vehicle for measuring the outside air temperature. A second temperature sensor 20 is provided at a position upstream of first heat exchanger 15 for detecting the temperature of the cooling/heating medium flowing into heat exchanger 15. Further, air conditioner 200 may include a plurality of valves for switching the flow of the refrigerant, as an alternative to four-way valve 2.

Figure 3:
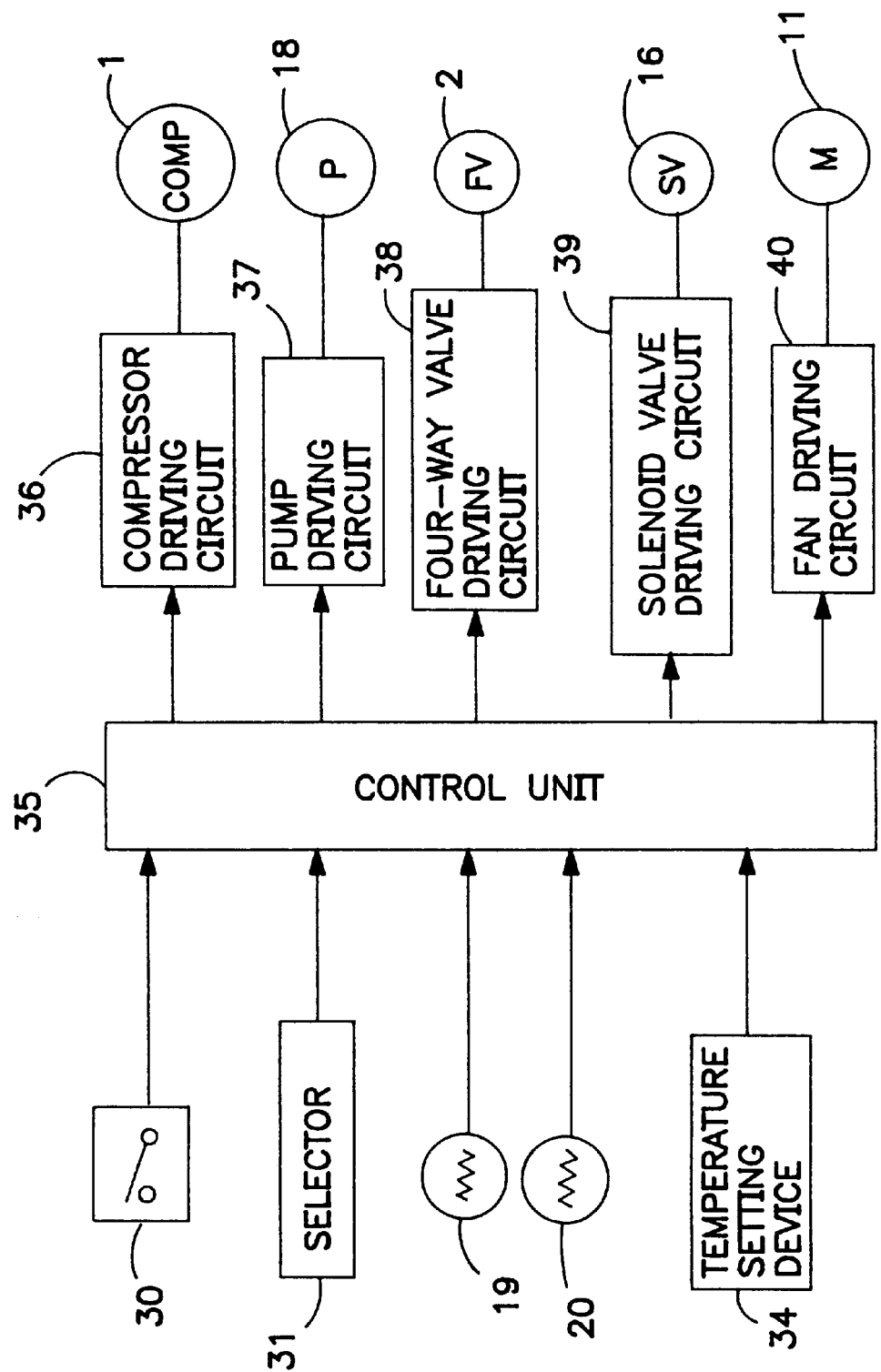
FIG. 3 is a block diagram of an a control circuit of the air conditioner depicted in FIG. 2.

FIG. 3 depicts a control circuit suitable for use in air conditioner 200. An air conditioner switch 30, a conditioning temperature setting device 34, and a selector 31 for selecting an operating mode, e.g., cooling or heating, are connected to a control unit 35, such as a microcomputer. Air conditioning switch 30 initiates the operation of air conditioner 200. Conditioning temperature setting device 34 may have a lever, buttons, or the like, for setting an air temperature to be controlled, and the temperature for air conditioning may be selected and set by the operation of the conditioning temperature setting device 34. Selector 31 for selecting an operating mode may have a switch lever capable of changing the selection between a "cool" position and a "heat" position.

Figure 4:
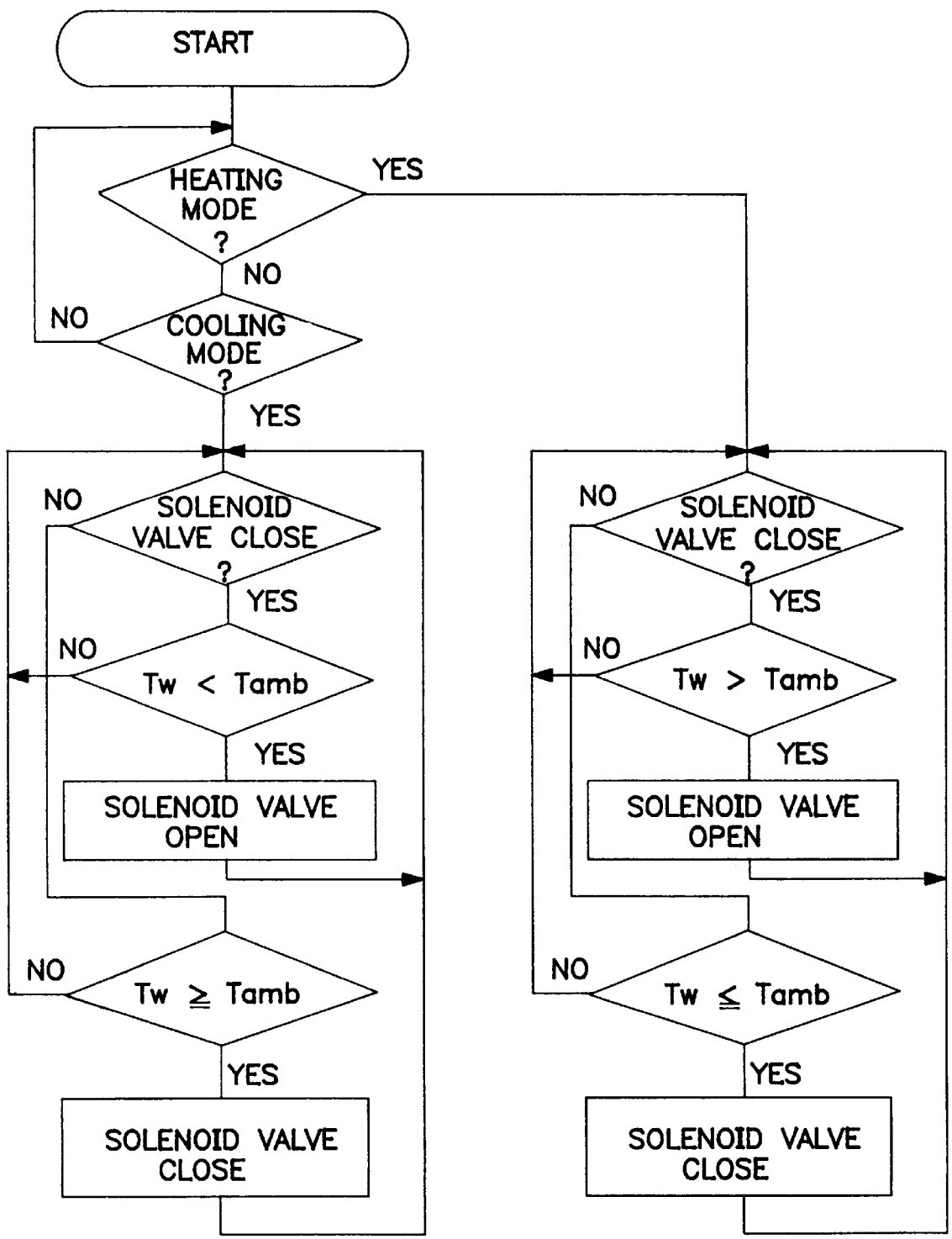
FIG. 4 is a flowchart depicting steps for control of the thermal energy recovery system depicted in FIG. 2.

Referring to FIGS. 3 and 4, control unit 35 may have a CPU, ROMs, RAMs, and the like, and suitable software for the control of switching conditions of the solenoid valves, as well as software for the control in the ROMs. Control unit 35 sends control signals to a compressor driving circuit 36, a pump driving circuit 37, a four-way driving circuit 38, a solenoid valve driving circuit 39, and a fan driving circuit 40. Compressor driving circuit 36 controls the rotational speed of compressor 1 in response to the rotational speed signal sent from control unit 35. Pump driving circuit 37 controls the activation and deactivation of pump 18 in response to the signals from air conditioner switch 30. Solenoid valve driving circuit 39 controls the opening and closing of the solenoid valve 2 in response to the detected signals of temperature sensors 19 and 20. Fan driving circuit 40 controls the volume of air supplied by motor fan 11 in response to an air volume signal sent from control unit 35.

In the cooling mode of operation, four-way valve 2 is switched as indicated by the solid lines in FIG. 1. In such a condition, compressor 1 and pump 18 are activated. The refrigerant discharged from compressor 1 flows to external heat exchanger 3 and is condensed therein. The condensed refrigerant flows to first expansion valve 5 and to internal heat exchanger 4 through first check valve 7 and receiver 9 and is evaporated therein. The evaporated refrigerant finally flows into compressor 1 through four-way valve 2. Thus, the cooling of passenger compartment 13 may be accomplished utilizing the heat-absorbing action of the refrigerant at internal heat exchanger 4. The air in passenger compartment 13 is then continuously vented to the outside of the vehicle through ventilation duct 14. Second heat exchanger 17 recovers energy which this vented air implicitly includes, so that the heating/cooling medium within second heat exchanger 17 exchanges heat with the air passing through ventilation duct 14. Further, energy recovered by second heat exchanger 17 and carried by the heating/cooling medium is circulated to working fluid passageway 15b of first heat exchanger 15 through working fluid circuit 22 by pump 18.

Referring to FIG. 4, when working fluid temperature "Tw" detected by thermal sensor 20 is less than outside air temperature "Ta" detected by thermal sensor 19 which is placed adjacent external heat exchanger 3 so as to be upstream of air flowing over the outside of engine compartment. Consequently, when working fluid temperature "Tw" is in the specified range, such that the refrigerant within first heat exchanger 15 is sufficiently condensed, solenoid valve 16 is opened, and a portion of the refrigerant discharged from compressor 1 flows into refrigerant passageway 15a of first exchanger 15.

Further, in the heating mode of operation, four-way valve 2 is switched as indicated by the dashed lines in FIG. 2. In such a condition, compressor 1 and pump 18 are again activated. The refrigerant discharged from compressor 1 flows to internal heat exchanger 4 and is evaporated therein. The evaporated refrigerant then flows to second expansion valve 6 and to external heat exchanger 3 through second check valve 8 and receiver 9 and is condensed therein. The condensed refrigerant finally flows into compressor 1 through four-way valve 2. Thus, the heating of passenger compartment 13 may be accomplished by the radiating action of the refrigerant at internal heat exchanger 4. The air within passenger compartment 13 is then continuously vented outside of the vehicle through ventilation duct 14. Second heat exchanger 17 recovers energy which this vented air implicitly includes, so that the heating/cooling medium within second heat exchanger 17 exchanges heat with the air passing through ventilation duct 14. Further, energy recovered by second heat exchanger 17 and carried by the heating/cooling medium is circulated to working fluid passageway 15b of first heat exchanger 15 through working fluid circuit 22 by pump 18.

In addition, when working fluid temperature "Tw" detected by thermal sensor 20 is greater than outside air temperature "Ta" detected by thermal sensor 19, that is when working fluid temperature "Tw" is in the specified range, such that the refrigerant within first heat exchanger 15 is sufficiently evaporated, solenoid valve 16 is opened, and a portion of the refrigerant discharged from compressor 1 flows into refrigerant passageway 15a of first exchanger 15. Alternatively, if air conditioner 200 is not provided with solenoid valve 16, the portion of the refrigerant discharged from compressor 1 may constantly flow into refrigerant passageway 15a of first heat exchanger 15.

Thus, second heat exchanger 17 recovers energy which the air exhausted to the outside of the vehicle through ventilation duct 14 implicitly includes. In the cooling mode of operation, such an air conditioning system accelerates the condensation of the refrigerant therein over that in heat pump system. In the heating mode of operation, such an air conditioning system accelerates the evaporation of the refrigerant therein over that in heat pump system. Therefore, such an air conditioning system increases the heating and cooling ability by obtaining high endothermic and radiating efficiency. As a result, such a system may reduce the energy expenditure necessary to maintain a constant temperature in the passenger compartment of the vehicle.

Figure 5:
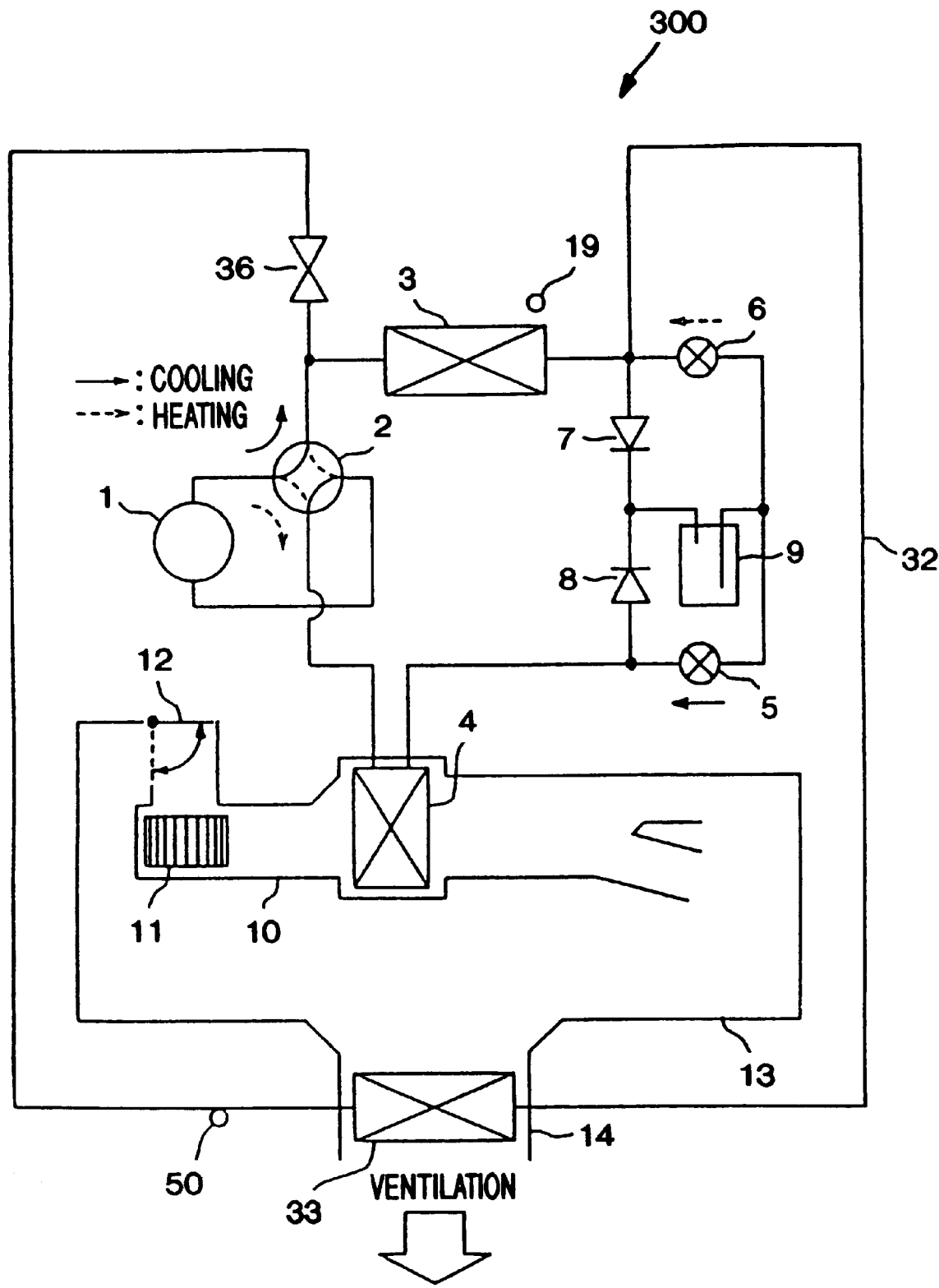
FIG. 5 is a schematic view of an air conditioner for vehicles including a refrigerant circuit diagram according to a second embodiment of the present invention.

Referring to FIG. 5, a second embodiment of the present invention is depicted. Elements similar to those discussed above are designated with the same reference numerals, and the following discussion focuses primarily on the features of the second embodiment.

An external heat exchanger 33 is disposed in ventilation duct 14 for recovering energy from air which is exhausted outside of the vehicle through ventilation duct 14. Solenoid valve 36 may be provided in the refrigerant circuit for closing and opening the path of the refrigerant flowing into external heat exchanger 33. In addition, second temperature sensor 50 is provided at a position upstream of external heat exchanger 33 for detecting the temperature of the refrigerant flowing into external heat exchanger 33. Therefore, external heat exchanger 33 may recover energy which the air exhausted to the outside of the vehicle through ventilation duct 14 implicitly includes. In the cooling mode of operation, such an air conditioning system accelerates the condensation of the refrigerant therein over that in heat pump system. In the heating mode of operation, such an air conditioning system accelerates the evaporation of the refrigerant therein over that in heat pump system. In this embodiment, substantially similar advantages to those obtained in the first embodiment may be achieved.

This invention has been described in detail in connection with a plurality of embodiments, but these embodiments are merely exemplary, and the invention is not to be construed as limited thereto. It will be apparent to those skilled in the art that other variations or modifications may be made within the scope of the invention as defined by the following claims.

What is claimed is:

1. An air conditioner for a vehicle comprising:
   a heat pump system for heating and cooling and including a refrigerant circuit and a ventilation passage for venting air from a passenger compartment of said vehicle to outside of said vehicle, wherein said heat pump system includes a first external heat exchanger mounted outside said passenger compartment and an internal heat exchanger mounted inside said passenger compartment and coupled to said external heat exchanger;
   accelerating means for accelerating evaporation of a refrigerant during air cooling and condensation of said refrigerant during air heating by recovering and using energy from air exhausted outside of said vehicle through said ventilation passage, wherein said accelerating means includes a second external heat exchanger of said heat pump-type refrigerant circuit, and a valve for selectively coupling said first external heat exchanger and said second external heat exchanger; and
   a control means coupled to said valve, said control means including a first sensor that detects a first temperature of air outside said vehicle and a second sensor that detects a second temperature of said refrigerant, and opens said valve during air cooling when said second temperature is less than said first temperature, and closes said valve during air heating when said second temperature is greater than said first temperature.

2. The air conditioner of claim 1, wherein said second external heat exchanger is disposed in said ventilation passage for exchanging heat with air exhausted outside of said vehicle through said ventilation passage.

3. The air conditioner of claim 1, wherein said heat pump system further includes a compressor disposed in a refrigerant circuit, said refrigerant circuit placing said external heat exchanger in fluid communication with said internal heat exchanger to permit refrigerant flow between said external and internal heat exchangers, a valve coupling said compressor and said external and internal heat exchangers, wherein said valve has at least two positions, a first position which enables refrigerant to flow to said external and internal heat exchangers in a first direction and a second position enabling refrigerant to flow in a second direction opposite to said first direction, and wherein said second external heat exchanger disposed in said ventilation passage exchanges heat between said refrigerant and air exhausted outside of said vehicle through said ventilation passage.

4. The air conditioner of claim 3, wherein said compressor is operated by an electric motor.

* * * * *